Sept. 18, 1956     O. I. STANGELAND     2,763,353
OVERRUNNING CLUTCH AND BACKSTOP DEVICE
Filed April 29, 1952                                  3 Sheets-Sheet 1
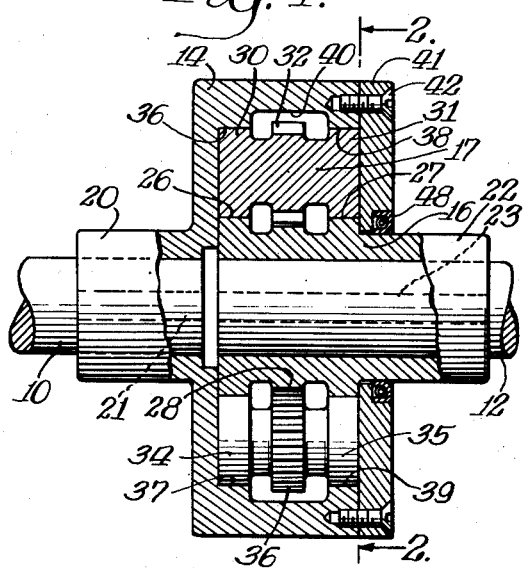
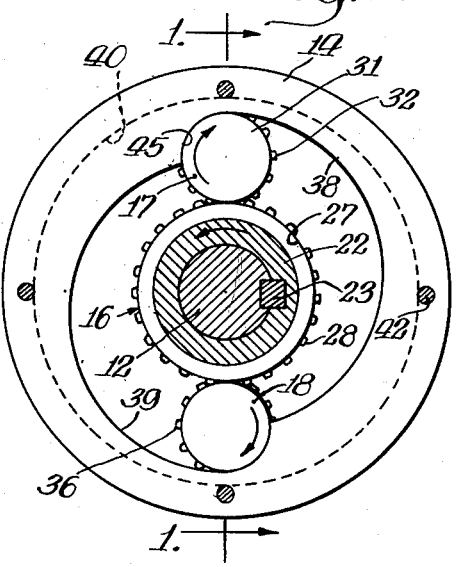
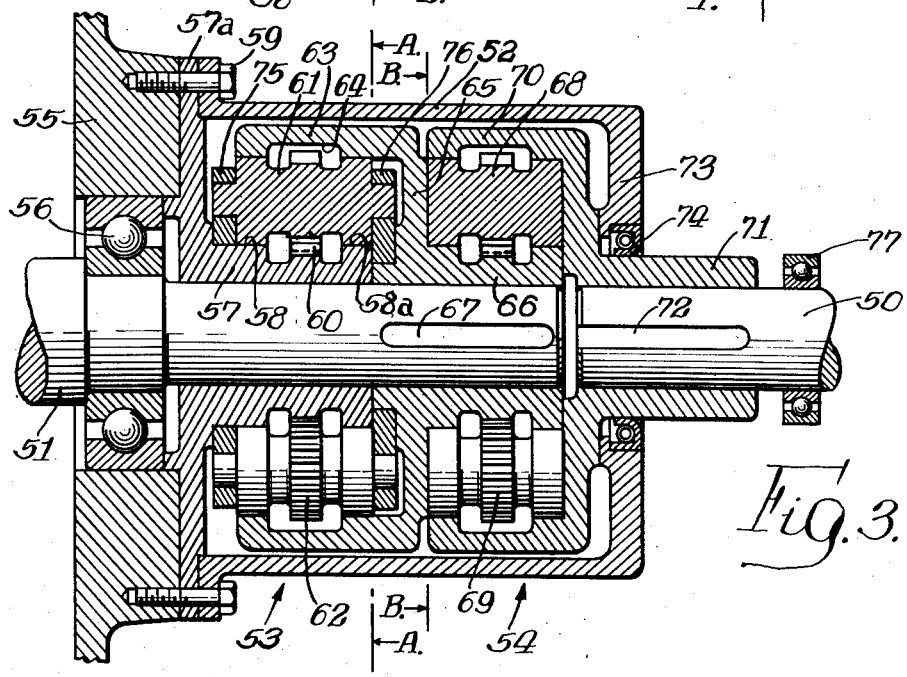
INVENTOR.
Ole I. Stangeland,
BY Fidler, Crouse & Beardsley
Attys.

Sept. 18, 1956     O. I. STANGELAND     2,763,353
OVERRUNNING CLUTCH AND BACKSTOP DEVICE
Filed April 29, 1952     3 Sheets-Sheet 2

INVENTOR.
Ole I. Stangeland,
BY Fidler, Crouse & Beardsley
Attys.

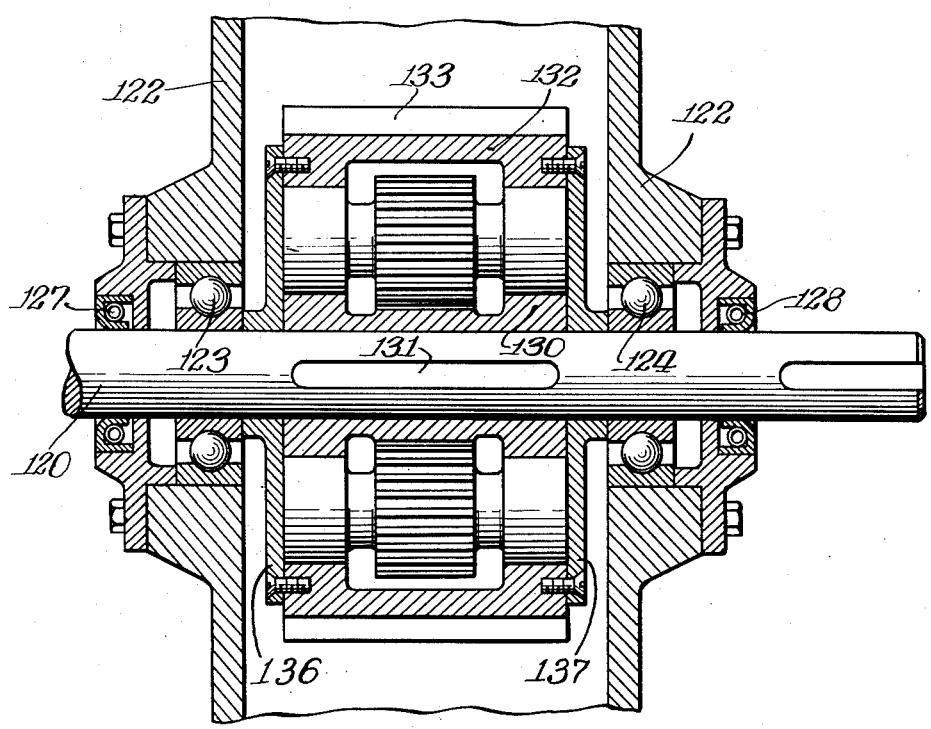

United States Patent Office 2,763,353
Patented Sept. 18, 1956

2,763,353

OVERRUNNING CLUTCH AND BACKSTOP DEVICE

Ole I. Stangeland, Chicago, Ill.

Application April 29, 1952, Serial No. 284,891

11 Claims. (Cl. 192—45)

The present invention relates to unidirectional drive or locking mechanisms and more particularly to an overrunning clutch and/or a back stop device for rotatable members.

Various types of overrunning clutches are known at the present time, of which most are made up of a great number of parts which have to be manufactured to close tolerances in order to make them function properly. In the most commonly known types of overrunning clutches, friction between the relatively movable parts and the locking members is utilized to position them in locking position and this necessitates at least some ever present frictional engagement which will cause wear no matter how well lubricated, and which will cause some frictional drag by the clutch. It is contemplated by the present invention to provide a simple device of the above character in which the various objectionable features pointed out have been avoided.

Accordingly, one object of the present invention is to provide a simple and effective overrunning clutch which may, without modification, also serve as a backstop device.

Another object is to provide a novel and simple clutch device having a minimum number of moving parts readily manufactured by standard machine shop tools.

Another object is to provide an effective and inexpensive overrunning clutch device having a small number of parts readily manufactured and assembled.

Another object is to provide a novel and simple overrunning clutch device comprising a small number of parts which do not have to be manufactured within close tolerances.

Another object is to provide a simple and effective overrunning clutch device wherein the locking action is positively effected independently of friction.

Another object is to provide a simple and effective overrunning clutch or backstop device producing substantially no drag on the relatively moving parts when in overrunning or disengaged condition but whose locking or engaging action is positive and immediate.

Another object is to provide a simple and effective positive acting clutch device which may be employed interchangeably as an overrunning clutch or as a backstop device of a very compact form readily built into and made part of existing equipments.

Another object is to provide a simple and effective clutch device which may readily and interchangeably be used as an overrunning clutch or a backstop device and of which two may readily be assembled to perform the function of both.

Still another object is to provide an effective and rugged positively engageable and disengageable overrunning clutch which may be used as a backstop device having as few as three relatively movable parts.

Another object is to provide a simple, compact and rugged overrunning clutch or backstop device which may readily be built directly into a rotatable member such as a gear, pinion or pulley, for example.

These and other objects and advantages of the invention will be readily apparent from the following description taken together with the following drawings wherein Fig. 1 illustrates the basic form of the invention;

Fig. 2 is a plan view of Fig. 1 taken along line 2—2 with cover removed;

Fig. 3 shows a device incorporating, in combination, the invention used as an overrunning clutch and as a backstop;

Fig. 6 shows a device wherein the overrunning clutch is built directly into a gear.

Figure 4:
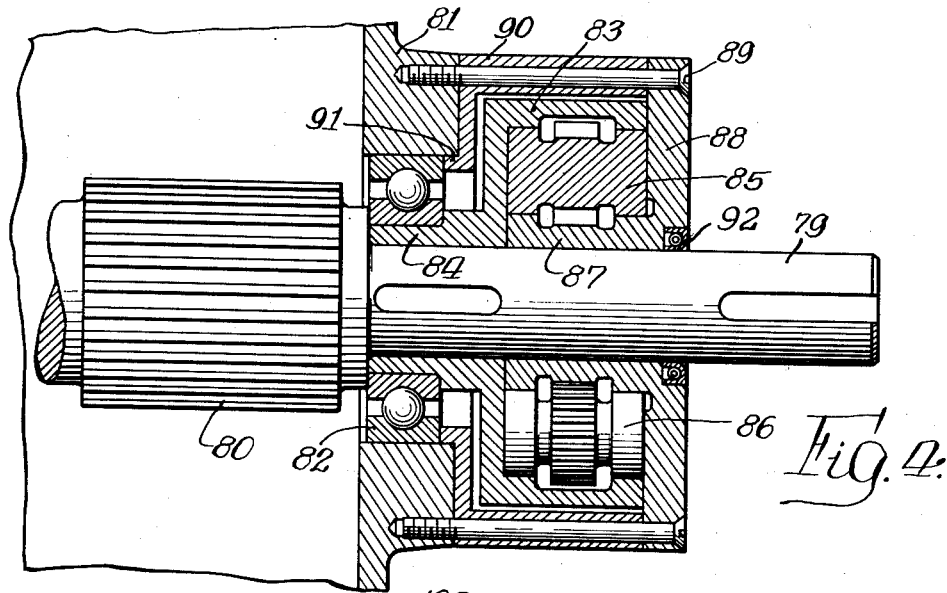
Fig. 4 shows the invention used as a simple backstop device.

For a better understanding of the basic principles of the present invention, reference is had to Figs. 1 and 2 wherein is shown its application as a simple overrunning clutch, often referred to as a free wheeling mechanism, connected between a driving shaft 10 and a driven shaft 12. The overrunning clutch makes it possible to rotate shaft 12 freely in a counterclockwise direction as viewed in Fig. 2 at any speed greater than that of shaft 10, but if the latter is caused to rotate faster than shaft 12, the clutch will instantly establish a positive driving connection between the two as will be described.

The clutch comprises generally a driving annular housing 14 surrounding a centrally located driven cylindrical member 16 that may be coupled thereto by means of a pair of locking members 17 and 18 which are geared to the cylindrical driven member and include circular rollers adapted to lock between external surfaces of the driven member and internal wedging surfaces of the driving housing.

Housing 14 is provided with a hub 20 for receiving shaft 10 which may be secured to the hub by means of a conventional key 21. Similarly, driven member 16 is provided with a hub portion 22 for receiving shaft 12 which preferably extends entirely through member 16 and is keyed thereto by means of a key 23. For proper operation of the clutch, shafts 10 and 12 should be rotatably mounted in bearings of the driving and driven machine, respectively, so that the axes of rotation thereof will be in accurate alignment.

The driven clutch member 16 comprises a pair of spaced ring members 26 and 27 and a gear 28 disposed between the ring members. Members 26 and 27 and gear 28 are preferably formed integrally with hub 22 as shown and, for reasons which will be apparent hereinafter, the diameters of the cylindrical members are equal to each other and equal to the pitch diameter of the gear.

Each of the locking members 17 and 18 comprises a pair of spaced circular rollers and a pinion disposed between the rollers. The pitch diameter of the pinion is equal to the diameters of the rollers and the rollers and pinion are preferably fashioned from a single piece of material. The pinion and rollers are so located with respect to each other that the pinion will engage gear 28 when the rollers register with cylindrical members 26 and 27 of the driven clutch member. Thus connecting member 17, shown in cross section in Fig. 1 comprises rollers 30 and 31 and pinion 32 and connecting member 18, shown in perspective, comprises rollers 34 and 35 and pinion 36. Pinions 32 and 36 are in engagement with gear 28 and rollers 30, 34 and 31, 35 are in rolling contact with ring members 26 and 27, respectively.

Formed internally of annular input housing 14 are a plurality of non-circular cylindrical surfaces or tracks 36, 37, 38 and 39 arranged for engagement by rollers 30, 31, 34 and 35, respectively, and shaped in a manner better shown in Fig. 2. Intermediate tracks 36, 37 and tracks 38, 39 there is formed an annular well 40 in order to provide clearance between the pinions 32 and 36 and the driving housing. Cover 41 fits around hub 22 and is secured to the end of housing 14 by means of a plurality of circumferentially spaced screws 42. A seal 48 is provided between the cover and the hub in order to prevent oil seepage therebetween so that the housing may be filled with lubricating oil to reduce the friction between the parts to a minimum when the clutch is in overrunning condition.

Tracks 36 to 39 are of identical shape. Tracks 36 and 37 and tracks 38 and 39, respectively, are in contiguous relationship as better shown in Fig. 2 which is an end view of Fig. 1 taken from the right as viewed in the drawing with cover 41 removed. It will be noted that each track has a bearing surface such as bearing surface 45 for roller 31, for example, and a gradually reduced diameter portion extending in a clockwise direction therefrom. The rollers are freely rotatable with respect to housing 14 while they are in the position shown against their respective bearing surfaces, but they will be prevented from rotating by the wedging action between the associated engaging surfaces of the inner and outer clutch members the moment the rollers are caused to move away from their bearing surfaces.

It will, therefore, be evident that as long as shaft 12 and driven clutch member 16 keyed thereto are rotating in the direction indicated by the arrow in Fig. 2 at a greater angular velocity than driving housing 14, an overrunning condition will exist. When housing 14 is stationary the axes of rotation of roller members 17 and 18 will remain in the positions shown, but the members will, of course, be caused to rotate about their respective axes against the bearing surfaces of tracks 38 and 39 by reason of the positive driving engagement of gear 28 with pinions 32 and 36.

Consider now what will happen if shaft 10 and housing 14 keyed thereto are caused to rotate in the same direction as shaft 12 but at a smaller angular velocity than that of shaft 12. In the following analysis the relationship between cylindrical member 27, roller 31 and track 38 and its bearing surface 45 as the clutch engages and disengages will be discussed, but it will, of course, be understood that what is said applies as well to the other corresponding parts in the clutch. Rotation of housing 14 in a counterclockwise direction will permit the axis of rotation of roller 31 to advance therewith and at the same angular velocity and the angular velocity of the roller about its own axis will be reduced by a corresponding amount. As the angular velocity of housing 14 is increased to approach the angular velocity of shaft 12 the angular velocity of roller 31 will decrease but the roller will, of course, be maintained in contact with the bearing surface 45 as long as it rotates about its own axis in the direction indicated by the arrow. When shaft 12 and housing 14 are rotating at exactly the same angular velocity, roller 31 will stop rotating about its own axis, but as yet there is no force applied to this roller to move it away from bearing surface 45.

As soon as member 14 is rotated at a greater speed than shaft 12, roller 31 will in effect roll against track 38, by reason of its positive engagement with respect thereto through the meshing gear 28 and pinion 32, until it is securely wedged between the gradually converging surfaces of member 27 and track 38. This action is substantially instantaneous and due to the very small angle between the tangents at the points of contact on opposite sides of the roller, continued application of force will only roll it more securely in between the opposite surfaces because of its positive engagement with respect to the inner surface. This wedging action may be better understood if only the relative movements of member 27, roller 31 and housing 14 are considered. Thus if member 27 is considered to be stationary, the linear speed at the point of contact between it and roller 31 at any instant of time will be zero and cannot be otherwise because of the positive engagement therebetween. As long as housing 14 rotates, or tends to rotate, with respect to member 27 in a counterclockwise direction, the linear velocity at the point of contact between the housing and the roller will tend to be greater than zero and, consequently, roller 31 will be positively forced into locking position. Roller 35 will be subjected to an identical action diametrically opposite the axis of rotation of shaft 12.

At this point it is pointed out that if shaft 12 is held stationary, shaft 10 and housing 14 are free to rotate at any speed in a clockwise direction as viewed in Fig. 2, but will be prevented by the clutch device described from turning in a counterclockwise direction and the latter will thus act as a backstop device.

Although a single locking member would be sufficient for securely locking the driving and driven members together, it is preferable to use at least two locking members in order to obtain a better dynamic balance. Inasmuch as the angular movement of the locking member with respect to the driving housing from a freely rotatable position and a locking position is quite small, a great number of circumferentially spaced locking members may be used by providing a locking track for each. Because of the positive connection between the locking member and the driven member it is not essential to form the parts with great precision which would be the case where friction is used for bringing the locking member into locking position.

It will also be evident from Fig. 1 that the clutch in accordance with the present invention also provides for axial balance by means of the axially spaced symmetrical arrangement shown. Because of the simplicity of the clutch, it may be made on simple machine tools to the desired accuracy, and because of the unitary construction between the axially spaced clutching members axial mismatch between the parts is not likely to occur.

It was pointed out above that the locking members are rolled into locking position and that they are not actuated by friction. The locking surfaces are therefore subjected to substantially no frictional wear, and such surfaces will therefore remain in their initial condition almost indefinitely. If the bearing surfaces of the tracks are properly formed to receive the rollers there will be very little wear on the respective surfaces because the only thrust between the engaging surfaces is that required to maintain the axial position of the locking members with respect to the housing 14.

After the overrunning clutch has been locked in position and the speed of the driving shaft is reduced below that of the driven shaft, the reverse action will take place. The positive engagement between driven member 16 and the locking members 17 and 18, will cause the locking members to rotate about their own axes and roll against their respective tracks into the position wherein they can rotate freely. The disengagement is therefore without drag on the rotating member 16 as there is no friction to be overcome.

Although it is preferable for a positive driving connection to make the outside member 14 the driving member, it will be evident that the inside member 16 may be connected to the driving shaft and the outside member to the driven shaft.

Fig. 3 shows an automatic coupling device comprising a combined backstop and overrunning clutch and connected between an input or driving shaft 50 and an output or driven shaft 51. The device is made up of two units similar to that shown in Fig. 1 of which one is connected as a backstop between the driven shaft and the stationary housing and the other is connected as an overrunning clutch between the driving shaft and the driven shaft. Thus in Fig. 3 the backstop device for preventing the driven shaft from rotating in a direction opposite from that intended is generally indicated at 53 and the overrunning clutch for forming a driving connection between the shafts is indicated at 54.

Driven shaft 51 is shown as being journaled in a stationary main housing 55 by means of antifriction bearings 56, which like other bearings mentioned herein, may be of any suitable type such as roller, ball or sleeve bearings.

This inner stationary member of the backstop 53 is in the form of a sleeve member 57 having an axial bore of sufficient size to permit free rotation of the driven shaft therein and having an outwardly extending flange portion 57a securely bolted to housing 55 by means of bolts 59 which also are used to secure the outside protective cover 52 to the housing as shown. Sleeve portion 57 is formed with axially spaced, annular cylindrical surfaces 58 and 58a and intermediate thereof a gear 60 having a pitch diameter equal to the outside diameters of annular surfaces 58 and 58a. Locking members 61 and 62 are similar to the locking members 17 and 18 of Fig. 1. The outside member 63 of the backstop, rotatable with shaft 51, is formed internally in the manner described in connection with driving housing 14 of Fig. 1 so as to form a track including a bearing surface for each of the rollers of the locking members 61 and 62 and an annular well 64 to provide clearance for the locking member pinions. Member 63 is in the form of a cylindrical shell extending to the left from a wall portion 65 projecting radially outwardly from a sleeve member 66 which is keyed to driven shaft 51 by means of a key 67 and which forms the inner member of the overrunning clutch 54. The outside or input end 70 of the clutch may be formed substantially like housing member 14 of Fig. 1 and is mounted on input shaft 50 by means of a hub 71 keyed to the shaft by a key 72. The clutch mechanism of overrunning clutch 54 may be exactly like that shown in Figs. 1 and 2, without the cover 41, and turned end for end so that the positions of the input and output shafts are reversed.

Cover 52 is formed so as to extend over the entire backstop and overrunning clutch assembly and is provided with an end wall 73 having an opening therein for receiving hub 71. An annular oil seal 74 is provided between the cover and the hub in order to permit the assembly to be partially submerged in lubricating oil.

In order to maintain the relative positioning of the locking members of the backstop device and to prevent endwise movements thereof, spacer members 75 and 76 may be provided as shown on opposite sides of the locking members. Member 75 may be held against a shoulder on sleeve 57 and member 76 may be disposed in a recess in the face of sleeve 66 as shown. Members 75 and 76 are provided with bearing openings for receiving stub shafts extending axially from opposite ends of the locking members as shown.

Input shaft 50 is journaled in bearings generally indicated at 77 so that it will be in axial alignment with shaft 51.

Assume that the assembly shown in Fig. 3 is arranged for clockwise rotation of the shafts as viewed from the right in the drawing. A cross-sectional cut along line A—A of Fig. 3 and viewed from the right will show the backstop arranged in the manner shown in Fig. 2 so that, when the inner member 57, corresponding to member 16 of Fig. 2, is held stationary, the outer member 63, corresponding to housing 14 of Fig. 2, will be free to rotate in a clockwise direction pushing the locking members therewith but will immediately be locked to the inner member if a force is applied thereto tending to rotate it in a counterclockwise direction. Overrunning clutch 54 will be arranged so that a section taken along line B—B and viewed from the left will appear as shown in Fig. 2. It will thus be evident from the discussion of the overrunning clutch of Figs. 1 and 2, that shaft 51 may rotate freely and independently of shaft 50 in a clockwise direction as viewed from the right in Fig. 3 as long as the rotational speed of shaft 51 exceeds that of shaft 50, but that it will be positively locked to shaft 50 immediately upon the latter acquiring a greater speed in the manner discussed above. Shaft 51 will be prevented from rotating in a counterclockwise direction with respect to housing 55 by the action of the backstop device 53.

Fig. 4 illustrates a simple and compact arrangement for applying the backstop device of the present invention to a pinion shaft 79 having keyed thereto a pinion 80 and journaled in a stationary housing 81 by means of bearings 82. The outer member 83 of the backstop device is constructed in the manner explained in connection with the device described in Figs. 1 and 2 and is formed integrally with a sleeve 84 through a radially extending end wall which also serves to prevent endwise movements of the locking members 85 and 86. Sleeve 84 is keyed to shaft 79 and is formed with a reduced diameter end portion which serves as a seat for bearing 82. The inner member of the backstop is in the form of a sleeve 87 having formed integrally therewith a radially extending flange portion 88. The backstop device is secured to the housing by means of a plurality of spaced bolts 89 passing through a cylindrical backstop retainer 90. The base of the retainer is provided with a shoulder 91 extending into the bearing recess in the housing to act as a bearing cap for bearing 82. The pinion shaft extends beyond the backstop device sufficiently to have mounted thereon a coupling or other means, not shown, for connecting it to a prime mover. Oil seal 92 is provided between the inside edge of flange 88 and the pinion shaft in order to prevent oil from leaking out between sleeve 87 and the shaft.

If pinion 80 and pinion shaft 79 are to rotate in a clockwise direction as viewed from the right in the drawing, the backstop device must be arranged in the manner shown in Figs. 1 and 2. The instant a force is applied to pinion 80 or pinion shaft 79 tending to rotate them in a counterclockwise direction, the locking members 85 and 86 will cause the backstop device to lock the shaft to the housing in the manner described above. As above pointed out, the force required to unlock the backstop is for all practical purposes negligible.

Figure 5:
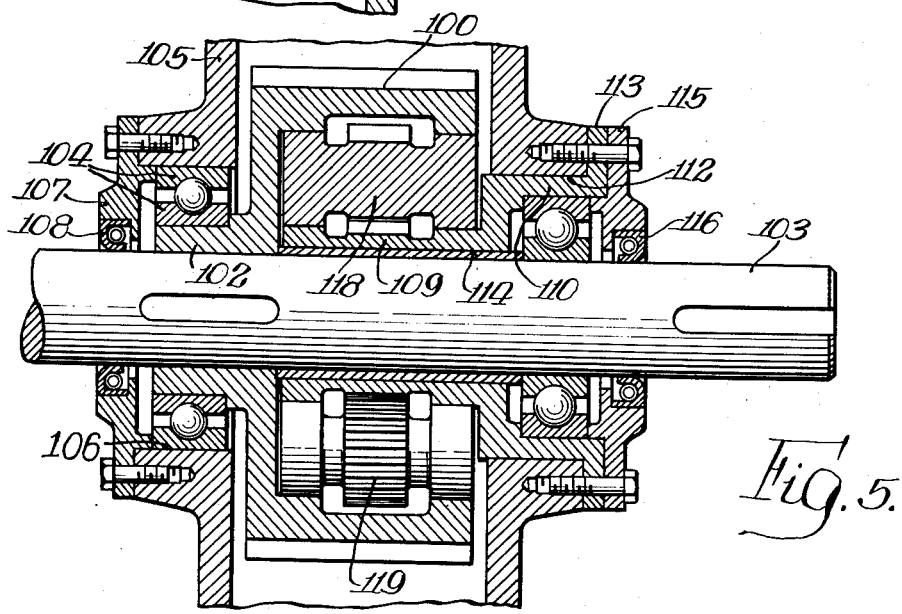
Fig. 5 shows a device wherein the backstop device is built directly into a gear.

Fig. 5 illustrates an arrangement wherein a backstop device in accordance with the invention is mounted wholly within a gear 100. The gear is formed internally in the manner described in connection with Figs. 1 and 2 to form the outside member of the backstop device. The gear hub 102 is keyed to a shaft 103 and forms the seat of a bearing 104 for the shaft for journaling the latter in main housing 105. The bearing is placed in a circular opening 106 in the housing and is held in place by a bearing cap 107 bolted to the housing as shown. An oil seal 108 is provided between the bearing cap and the shaft. The inner member of the backstop device is in the form of a sleeve surrounding the shaft and is formed integrally with an expanded diameter portion 110 fitting snugly within circular mounting opening 112 in the housing and with an outwardly extending mounting flange 113. A second bearing for the shaft is received within portion 110 and is held in position with respect to the gear by means of a spacer liner 114 abutting the end of hub 102 and freely rotatable with shaft 103 within the inner stationary member 109 of the backstop. Bearing cap 115 together with flange 113 are bolted to the end of the housing as shown. An oil seal 116 is provided between the bearing cap and the shaft. A pair of backstop locking members 118 and 119 as described in connection with the device illustrated in Fig. 1 are provided between the outside member 100, which as above noted, is formed by the gear itself, and the stationary inside member 109 of the backstop. The direction of the locking tracks within the gear will, of course, depend on the direction of the desired rotation thereof. For example, if it is desired to rotate the shaft in a clockwise direction as viewed from the right in Fig. 5, the locking tracks will, when viewed from the right, appear as shown in Fig. 2. A driving pinion (not shown) meshed with gear 100 will therefore be able to rotate the gear and the shaft keyed thereto in a clockwise direction without interference from the backstop device. If for some reason a force is applied to the pinion or to the shaft tending to cause it to reverse its direction of rotation, the gear will immediately be locked to the housing by the action of locking members 118 and 119 as described above. The desirability of such a backstop built directly into a gear will at once be apparent to a person skilled in the art. Although the outside member of the backstop was described as being formed integrally with the gear, it may also be made in the form of a liner which could be fitted into the gear and locked therein whereby the direction in which the gear was permitted to rotate could readily be changed by merely inversing the liner.

Fig. 6 illustrates an arrangement wherein an overrunning clutch in accordance with the invention is mounted directly within a gear to form a unidirectional coupling between the gear and a shaft. In Fig. 6 there is shown a shaft 120 journaled within spaced wall portions 121 and 122 of a main housing by means of a pair of bearings 123 and 124. Bearing caps 125 and 126 are provided for the respective bearings and are bolted to opposite ends of the housing. Oil seals 127 and 128 are provided between the respective bearing caps and the shaft. The inside member 130 of the overrunning clutch is in the form of a sleeve securely keyed to the shaft by means of a key 131. The outside member 132 of the clutch is formed directly within a gear 133. Clutch locking members 134 and 135 as described above are provided between the clutch members. Gear retainer plates 136 and 137 are provided on opposite sides of the gear and are secured thereto such as by a plurality of screws as shown. The gear retainer plates are rotatably mounted on the shaft and abut the rotating part of the adjacent bearings 123 and 124, respectively. If the locking tracks of the outside member 132 are formed as shown in Fig. 2 when viewed from the right in Fig. 6, gear 133 will overrun shaft 120 when rotated in a clockwise direction as viewed from the right with respect to the shaft, and, reversely, shaft 120 will overrun the gear when rotated in a counterclockwise direction with respect thereto. When gear 133 is caused to rotate in a counterclockwise direction, for example, by a pinion, not shown, meshing therewith, the gear will immediately lock to the shaft through the clutch in the manner described in connection with Figs. 1 and 2, to form a positive driving connection therewith. The outside member of the clutch may, of course, be made in the form of a liner to be fitted directly within the gear and locked thereto. The direction of overrun between the shaft and gear in Fig. 6 may readily be reversed either by turning the gear end-for-end or, if a liner is used, by turning the liner end-for-end.

No specific relative sizes between the gear and roller portions of the inner member of the clutch or backstop device and the locking members have been specified because they may be selected to suit the specific requirements dictated by the physical size of the machinery with which it is to be used, the speed of the parts and the load requirements. The relative sizes required of the parts may readily be worked out by a person skilled in the art in the light of the above description.

It was pointed out that the length of linear travel of the locking members with respect to the outside member of the device between a freely rotatable and a locking position may be made very short, and a large number of locking members may therefore be provided if required by the load. For dynamic balance it is preferable that at least two locking members are used, although one would be sufficient, and if more than two are used they should preferably be equally spaced about the periphery.

It was also pointed out that when the clutch is in an overrunning condition, the locking members will be caused to rotate against a bearing surface forming a continuation of the locking tracks of the outside clutch member. It will be evident that this bearing surface may be extended along the periphery of the rollers of the locking member to a point where it just clears the surface of the inside member. This bearing surface is shown as being of the plain sliding type, but may, if desired, be made in the form of an antifriction roller or ball bearing. The thrust against this bearing surface is only that produced by the freely rotating roller member when the clutch is in an overrunning condition, and the bearing surface is, of course, out of engagement with the rollers when the clutch is in an engaged condition. The wear against this bearing surface is therefore negligible. It was also pointed out that the relative movement between the track and the rollers is essentially a rolling one because of the positive driving connection between the locking members and the inner member of the clutch. Substantially no frictional wear does therefore occur on the contacting surfaces of the rollers and tracks. The main force applied to the rollers and for which they have to be designed to withstand is the crushing force applied between the tracks and the opposite cylindrical surfaces of the inner members. Inasmuch as the rollers and the cylindrical surfaces are of the same diameter as the pitch diameters of the gears formed integrally therewith, the crushing strain is taken by such cylindrical members and rollers and the tangential or driving force by the meshing gears.

Because of the positive engagement described, the rollers of the locking members do not have to be made to such close tolerances as has been the case with overrunning clutches heretofore used. Even if a slight difference in overall dimensions of the rollers or between the tracks associated therewith should be present, the rollers will quickly adjust themselves to equalize the load due to the positive locking action pointed out.

In the above described devices the camming surfaces were shown as being associated with the outer member and the positive driving connection for the locking members as being associated with the inner member, but it is contemplated to also cover devices wherein the camming surfaces are associated with the inner member and the driving connection for the locking members is associated with the outer member.

Although specific embodiments of the invention have been described and illustrated, it will be evident to those skilled in the art that various changes and modifications thereof may be made and various combinations of the device as backstop and overrunning clutch may be devised without departing from the spirit and scope of the invention.

I claim:

1. A device of the character described comprising a pair of telescoping relatively rotatable members, one of said members including a pair of first axially spaced circular cylindrical surfaces and, interposed therebetween in coaxial relationship therewith, a gear having a pitch diameter equal to the diameter of said cylindrical surfaces, the other of said members having a pair of second axially spaced cylindrical surfaces in juxtaposed relationship with respective ones of said first surfaces, each of said second surfaces having at least one camming portion, said camming portions of the respective surfaces being in axial alignment and being formed so as to decrease gradually from a certain spacing to a narrower spacing with respect to said juxtaposed first surfaces, locking means interposed between said members comprising a pair of axially spaced cylindrical members and at least one pinion having a pitch diameter equal to the diameter of said cylindrical members, said cylindrical members and said at least one pinion of said locking means being arranged for engagement with respective ones of said first surfaces and said gear of said one of said members, said cylindrical members having a diameter smaller than said certain spacing between said first surfaces and said camming portions of said second surfaces of said other member but larger than said narrower spacing therebetween, and actuating means for said locking means stationary with respect to said other member for maintaining said locking means within the confines of the associated camming portions.

2. An overrunning clutch comprising a driven member, a driving member surrounding said driven member, said driven member including a pair of axially spaced circular cylindrical external surfaces and, interposed therebetween in coaxial relationship therewith, at least one gear having a pitch diameter equal to the diameter of said cylindrical surfaces, said driving member having a pair of axially spaced cylindrical internal surfaces in juxtaposed relationship with respective ones of said circular cylindrical surfaces of said driven member, each of said surfaces of said driving member having in axial alignment at least one camming portion, each camming portion gradually decreasing from a certain spacing to a narrower spacing with respect to said juxtaposed cylindrical surfaces of said driven member, locking means disposed between said driving and driven members comprising a pair of axially spaced cylindrical members having at least one pinion therebetween, said at least one pinion having a pitch diameter equal to the diameter of said cylindrical members, said cylindrical members and said at least one pinion of said locking means being arranged for engagement with respective ones of the spaced cylindrical surfaces and said at least one gear of said driven member, said cylindrical members having a diameter smaller than said certain spacing between said juxtaposed cylindrical surfaces of said driven member and said camming portion of said cylindrical surface of said driving member but larger than said narrower spacing therebetween, and actuating means for said locking means movable with said driving member for maintaining said locking means within the confines of the associated camming portion.

3. A backstop device comprising a driven member, a stationary member surrounding said driven member, said driven member including a pair of axially spaced circular cylindrical external surfaces and, interposed therebetween in coaxial relationship therewith, at least one gear having a pitch diameter equal to the diameter of said cylindrical surfaces, said stationary member having a pair of axially spaced cylindrical surfaces in juxtaposed relationship with respective ones of said circular cylindrical surfaces of said driven member, each of said surfaces of said stationary member having in axial alignment at least one camming portion, each camming portion gradually decreasing from a certain spacing to a narrower spacing with respect to said juxtaposed cylindrical surfaces of said driven member, locking means interposed between said members comprising a pair of axially spaced cylindrical members having at least one pinion therebetween, said at least one pinion having a pitch diameter equal to the diameter of said cylindrical members, said cylindrical members and said at least one pinion of said locking means being arranged for engagement with respective ones of the spaced cylindrical surfaces and said at least one gear of said driven member, said cylindrical members having a diameter smaller than said certain spacing between said juxtaposed cylindrical surfaces of said driven member and said camming portion of said cylindrical surfaces of said stationary member but larger than said narrower spacing therebetween, and stationary restraining means for said locking means for maintaining said locking means within the confines of the associated camming portion.

4. A device of the character described comprising a pair of telescoping relatively rotatable members, one of said members including a pair of first axially spaced circular cylindrical surfaces and, interposed therebetween in coaxial relationship therewith, at least one gear having a pitch diameter equal to the diameter of said cylindrical surfaces, the other of said members having a pair of second axially spaced cylindrical surfaces in juxtaposed relationship with respective ones of said first surfaces, said second surfaces having a plurality of axially aligned circumferentially symmetrically spaced camming portions, said camming portions being formed so as to decrease gradually from a certain spacing to a narrower spacing with respect to said juxtaposed first surfaces, a plurality of locking members interposed between said rotatable members at the locations of said camming portions, each locking member comprising a pair of axially spaced cylindrical portions and interposed therebetween at least one pinion having a pitch diameter equal to the diameter of said cylindrical portions, said cylindrical portions and said at least one pinion of said locking members being arranged for engagement with respective ones of said spaced cylindrical surfaces and said at least one gear of said one of said members, said cylindrical portions having a diameter smaller than said certain spacing between said first surfaces and said camming portions of said second surfaces of said other member but larger than said narrower spacing therebetween, and actuating means for said locking members stationary with respect to said other member for maintaining said locking means within the confines of the associated camming portions.

5. A combined overrunning clutch and backstop device, the clutch portion and the backstop portion each comprising a pair of telescoping relatively rotatable members, said members having juxtaposed spaced cylindrical surfaces, one of said surfaces being circular cylindrical, the other of said surfaces being formed with at least one camming portion having at one location a wider spacing from said circular cylindrical surface than at another location, the member having the circular cylindrical surface including a gear having a pitch diameter substantially equal to the diameter of said circular cylindrical surface, circular cylindrical locking means interposed between said camming portion and said circular cylindrical surface having a diameter smaller than the spacing at said one location but larger than the spacing at said other location thereof, said locking means including a gear having a pitch diameter equal to the diameter of said locking means, means for maintaining said locking means within the confines of said camming portion, said relatively rotatable members of said clutch portions being connected to respective ones of driving and driven members, and said backstop portions being connected to respective ones of one of said driving and driven members and a fixed stationary member, said camming surfaces of said clutch portion and said backstop portion being arranged in opposite sense and in a direction corresponding with the desired rotation of said driving and driven members.

6. A combined overrunning clutch and backstop device in accordance with claim 5, the outside member of said clutch device being connected to the driving member, the inside member of said clutch device being connected to said driven member and to the outside member of said backstop portion, and the inside member of said backstop portion surrounding said driven member and being rigidly connected to a stationary housing.

7. A combined overrunning clutch and backstop device in accordance with claim 6, said camming surfaces being located internally of the outside members of the clutch and backstop portions.

8. Backstop device for a drive member fixedly mounted on a shaft and having a coaxial recess therewithin, comprising stationary sleeve means surrounding said shaft in spaced relationship therewith disposed within said recess, spaced cylindrical surfaces externally of said sleeve means and internally of said recess in said drive member disposed in juxtaposed relationship, one of said cylindrical surfaces being circular, the other of said surfaces having a camming portion formed therein, said camming portion decreasing gradually from a certain spacing from said circular surface to a narrower spacing therefrom, gear rigidly affixed to that one of said sleeve means and said driving member having the circular cylindrical surface, said gear having a pitch diameter equal to the diameter of said circular cylindrical surface, circular cylindrical locking means disposed between said camming portion and said circular cylindrical surface, said locking means having a diameter smaller than said certain spacing but larger than said narrower spacing, said locking means including a pinion in engagement with said gear and having a pitch diameter equal to the diameter of said locking means, and means for maintaining said locking member within the confines of said camming portion.

9. Overrunning clutch for connection between a shaft and a drive member having a coaxial cylindrical recess therewithin comprising sleeve means keyed to said shaft and disposed within said recess, juxtaposed cylindrical surfaces externally of said sleeve means and internally of said recess, one of said surfaces being circular and the other being provided with at least one camming portion decreasing gradually from a certain spacing to a narrower spacing therefrom, a gear rigidly affixed to that one of said sleeve means and said drive member having the circular cylindrical surface, said gear having a pitch diameter equal to the diameter of the circular cylindrical surface, circular cylindrical locking means disposed between said camming portion and said circular cylindrical surface, said locking means having a diameter smaller than said certain spacing but larger than said narrower spacing, and including a pinion in engagement with said gear and having a pitch diameter equal to the diameter of said circular cylindrical locking means and means for maintaining said locking means within the confines of said camming portion.

10. An overrunning clutch comprising coaxial rotatable driving and driven members, one of said members having a first circular, cylindrical surface and including a gear member having a pitch diameter equal to the diameter of said surface, the other of said members having a second cylindrical surface in juxtaposed relation with respect to said first surface and spaced therefrom, said second surface including at least one camming portion, said camming portion being so formed that the distance therefrom to the first surface decreases from a certain spacing to a smaller spacing, locking means comprising a circular cylindrical member and a pinion having a pitch diameter equal to the diameter of said cylindrical member, said cylindrical member being disposed between said first surface and said camming portion of said second surface and said pinion being in mesh with said gear member of said one clutch member, said cylindrical member having a diameter smaller than said certain spacing between said first surface and said camming portion but larger than said smaller spacing, and actuating means for said locking means movable with said other member for maintaining said locking means within the confines of said camming portion.

11. An overrunning clutch comprising a driven member secured to a driven shaft, a driving member surrounding said driven member and including a radially inwardly extending flange portion and terminating in a hub for mounting on a driving shaft, said driven member including a pair of axially spaced circular cylindrical external surfaces and, in coaxial relationship therewith, at least one gear having a pitch diameter equal to the diameter of said cylindrical surfaces, said driving member having a pair of axially spaced cylindrical internal surfaces in juxtaposed relationship with respective ones of said circular cylindrical surfaces of said driven member, each of said surfaces of said driving member having in axial alignment at least one camming portion, each camming portion gradually decreasing from a certain spacing to a narrower spacing with respect to the associated juxtaposed cylindrical surface of said driven member, locking means disposed between said driving and driven members comprising a pair of axially spaced cylindrical members and at least one pinion, said at least one pinion having a pitch diameter equal to the diameter of said cylindrical members, said cylindrical members and said at least one pinion of said locking means being arranged for engagement with respective ones of the spaced cylindrical surfaces and said at least one gear of said driven member, said cylindrical members having a diameter smaller than said certain spacing between said juxtaposed cylindrical surfaces of said driven member and said camming portion of said cylindrical surface of said driving member but larger than said narrower spacing therebetween, an end plate secured to said driving member opposite said flange portion and surrounding said driven shaft to confine said driven member and said locking means between said end plate and said flange portion to maintain them in aligned condition, and actuating means for said locking means movable with said driving member for maintaining said locking means within the confines of the associated camming portion.

References Cited in the file of this patent

UNITED STATES PATENTS

| | | |
|---|---|---|
| 360,262 | Wehner | Mar. 29, 1887 |
| 388,233 | Wehner | Aug. 21, 1888 |
| 836,097 | Dann | Nov. 20, 1906 |
| 1,362,011 | Kirby | Dec. 14, 1920 |